United States Patent
Loup et al.

(10) Patent No.: US 6,203,420 B1
(45) Date of Patent: Mar. 20, 2001

(54) MOTOR-VEHICLE HEATING AND/OR AIR-CONDITIONING DEVICE, WITH COMPACT MOTOR-DRIVEN FAN UNIT

(75) Inventors: Didier Loup; Michel Raccouard, both of Maurepas; Mounir Ben Fredj, Montigny le Bretonneux, all of (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 09/452,316

(22) Filed: Dec. 1, 1999

(30) Foreign Application Priority Data

Dec. 1, 1998 (FR) .................................................. 98 15132

(51) Int. Cl.$^7$ ...................................................... B60H 1/26
(52) U.S. Cl. ............................................................. 454/139
(58) Field of Search ............................... 454/139; 165/42, 165/43

(56) References Cited

U.S. PATENT DOCUMENTS 2,185,486 * 1/1940 Wahlberg .............................. 454/139

FOREIGN PATENT DOCUMENTS

| 2 110 896 | * 9/1972 | (DE) | ..................................... 454/139 |
| 198 00 103 | 7/1998 | (DE) . | |
| 1-186414 | * 7/1989 | (JP) | ..................................... 454/139 |

OTHER PUBLICATIONS

Patent Abstracts of Japan, vol. 012, No. 464 (M–771), Dec. 6, 1988 & JP 63 188515 A (Hitachi Ltd), Aug. 4, 1988.
French Search Report Dated Aug. 4, 1999.

* cited by examiner

Primary Examiner—Harold Joyce
(74) Attorney, Agent, or Firm—Morgan & Finnegan, L.L.P.

(57) ABSTRACT

A motor-vehicle heating and/or air-conditioning device has an air intake chamber (12) with an inlet (14) for outside air (AE), an inlet (16) for recirculated air (AR) and a flap (18) for selectively controlling the inlets. A motor-driven fan unit (28) downstream of the air intake chamber has a casing (30) accommodating a centrifugal turbine (34) driven by a motor (48). The fan unit takes in air flow axially then delivers it tangentially. The. combination formed by the outside-air inlet (14) and the recirculated-air inlet (16) extends on either side of an arbitrary plane (P) passing through the axis of rotation (50) of the motor (48), the latter being located on the same side as the air inlets (12) and (14), which makes it possible to reduce the axial space taken up.

13 Claims, 4 Drawing Sheets

MOTOR-VEHICLE HEATING AND/OR AIR-CONDITIONING DEVICE, WITH COMPACT MOTOR-DRIVEN FAN UNIT

FIELD OF THE INVENTION

The invention relates to devices for heating and/or air-conditioning motor vehicles.

BACKGROUND OF THE INVENTION

Devices of the type comprising an air intake chamber provided with an inlet for outside air, with an inlet for recirculated air and with at least one flap which can selectively control said inlets, as well as a motor-driven fan unit which is arranged downstream of the air intake chamber and comprises a casing accommodating a centrifugal turbine which is driven by a motor, is provided with blades and can take in an air flow axially then deliver it tangentially to a heating and/or air-conditioning unit are known.

In a device of this type, the air intake chamber is supplied with a flow of outside air and/or of recirculated air which is then delivered under pressure by the motor-driven fan unit, also referred to as a blower, to the heating and/or air-conditioning unit which has at least one heat exchanger (heating radiator and, optionally, evaporator) for heating or cooling the air flow which is then to be sent to the passenger compartment of the vehicle through various distribution pipes and outlets.

The casing of the motor-driven fan unit customarily has a peripheral spiral which, with an increasing cross-section, encloses the turbine and can divert the air flow thus delivered into the tangential direction.

In known devices, the motor of the motor-driven fan unit is generally arranged on the opposite side from the air inlets of the air intake chamber, so that the air flow can enter the casing of the motor-driven fan unit through a circular opening which, at the same time, constitutes the exit of the air intake chamber.

This solution is favorable for supplying the casing of the motor-driven fan unit with air, but has the drawback of increasing the axial space taken up by the casing, because of the layout of the motor.

Furthermore, this layout of the motor, which is then generally located on the same side as the passenger compartment, generates noise which can propagate with ease into the passenger compartment through the various distribution pipes.

Another drawback of this known solution is that it is difficult to provide means for taking the motor-driven fan unit apart easily.

It has also been proposed to locate the motor of the motor-driven fan unit on the same side as the outside-air inlet and the recirculated-air inlet. However, this further solution has substantially the same drawbacks as the solution mentioned above, because of the respective positions of the air inlets.

OBJECT OF THE INVENTION

One object of the invention is, in particular, to overcome the drawbacks mentioned above.

SUMMARY OF THE INVENTION

According to the present invention there is provided a motor-vehicle heating and/or air-conditioning device, comprising an air intake chamber having an inlet for outside air, an inlet for recirculated air and at least one flap which can selectively control said inlets, as well as a motor-driven fan unit which is arranged downstream of the air intake chamber, the fan unit comprising a casing accommodating a centrifugal turbine which is driven by a motor and being provided with blades and being able to take in an air flow axially, then deliver it tangentially to a heating and/or air-conditioning unit, wherein the combination formed by the outside-air inlet and the recirculated-air inlet extends on either side of an arbitrary plane passing through the axis of rotation of the motor of the motor-driven fan unit, said motor being located on the same side as the outside-air inlet and the recirculated-air inlet, and therefore on the same side as the intake of the air flow into the air intake chamber.

This particular way of arranging the two air inlets, in combination with the layout of the motor on the same side as the air intake, allows the axial space taken up by the motor-driven fan unit to be reduced substantially.

In addition, this solution makes it possible to reduce the noise generated by the motor-driven fan unit, and also allows better cooling of the motor.

It should also be noted that this solution makes it easier for the motor-driven fan unit to be taken apart.

According to another characteristic of the invention, the casing of the motor-driven fan unit is provided with a circular opening which communicates with the air intake chamber, and the motor extends axially through said circular opening so that the air flow can enter the casing of the motor-driven fan unit through an annular passage Because the air flow enters the casing of the motor-driven fan unit through an annular opening, instead of a circular opening as in the prior art, it may in certain cases be necessary to increase the cross-section of the shroud of the casing in order to have an equivalent flow cross-section. This solution improves the cooling of the motor, and therefore extends its life.

What is more, the resulting increase in the diameter of the turbine makes it possible to reduce the height of the spiral, allowing a saving in axial size, and a reduction in the rotational speed of the motor, and therefore a reduction in noise.

Advantageously, the device has a ratio A/S2 of between 0.5 and 0.8, and preferably equal to 0.7, where A represents the area of the annular surface bounded externally by the inner edge of the blades of the turbine and internally by the outer edge of the body of the motor of the turbine, while S2 represents the area of the surface of the disc bounded by the inner edge of the blades of the turbine.

According to another advantageous characteristic of the invention, the axis of rotation of the motor is designed to extend substantially along the longitudinal axis, or X-axis, of the vehicle. This also contributes to reducing the space taken up by the assembly.

In this case, the motor is advantageously intended to be placed towards the front of the vehicle, next to the partition separating the engine compartment from the passenger compartment. Installing it in this way contributes to reducing the noise generated by the motor-driven fan unit.

It is advantageous to use at least one flap which is arranged as close as possible to the motor, in order to contribute to reducing the space taken up. As used here, the term "flap" is intended to mean any shut-off means which can selectively control the outside-air inlet and the recirculated-air inlet.

In a first embodiment of the invention, the device comprises a pivoting flap, of the drum or shell type, which can control the outside-air inlet and the recirculated-air inlet and has two pivots spaced apart and defining the pivoting axis of the flap.

The two pivots are advantageously located on either side of the motor, so that the axis of pivoting of the flap passes virtually through the motor. This solution allows the axial space taken up to be reduced further.

In a second embodiment of the invention, the device comprises two sets of flaps, of the butterfly or slotted-shutter type, which can respectively control the outside-air inlet and the recirculated-air inlet.

In a third embodiment of the invention, the device comprises two flaps, of the shell type, whose movements are co-ordinated and which can respectively control the outside-air inlet and the recirculated-air inlet.

In a fourth embodiment of the invention, the device comprises two flaps, of the film type, whose movements are co-ordinated and which can respectively control the outside-air inlet and the recirculated-air inlet.

In a fifth embodiment of the invention, the device comprises one flap, of the film type, which can control the outside-air inlet and the recirculated-air inlet.

It is also possible to combine different types of flap.

According to yet another characteristic of the invention, the casing of the motor-driven fan unit comprises a removable cover located on the opposite side from the motor.

When the casing of the motor-driven fan unit comprises a peripheral spiral, it is advantageous for the cover to comprise a substantially flat base connected to a peripheral rim which can engage by interlocking with a peripheral rim of the casing, so that these peripheral rims together form the peripheral spiral.

BRIEF DESCRIPTION OF THE DRAWINGS

In the description below, reference is made to the appended drawings in which.

DESCRIPTION OF THE PREFERRED EMBODIMENTS

Figure 1:
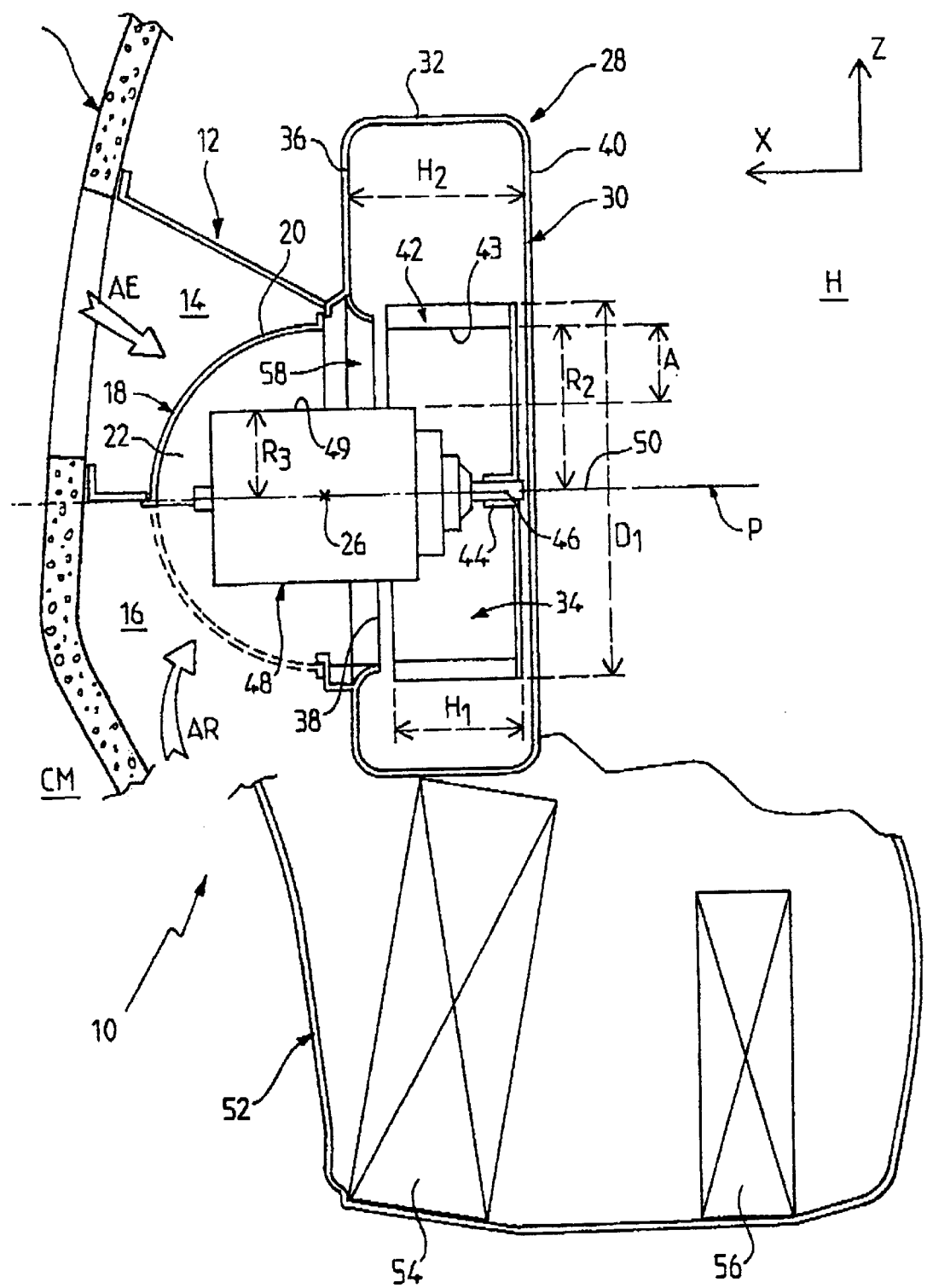
FIG. 1 is a partial view in longitudinal section of a heating and/or air-conditioning device according to a preferred embodiment of the invention.

In the various figures, like reference numerals refer to like parts.

Reference will firstly be made to FIG. 1, which represents a device 10 for heating and/or air-conditioning the passenger compartment H of a motor vehicle. This device 10 is installed behind a partition T which separates the engine compartment CM from the passenger compartment H. The longitudinal axis, or X-axis, of the vehicle has also been represented in FIG. 1 by an arrow whose head points towards the front of the vehicle.

Figure 2:
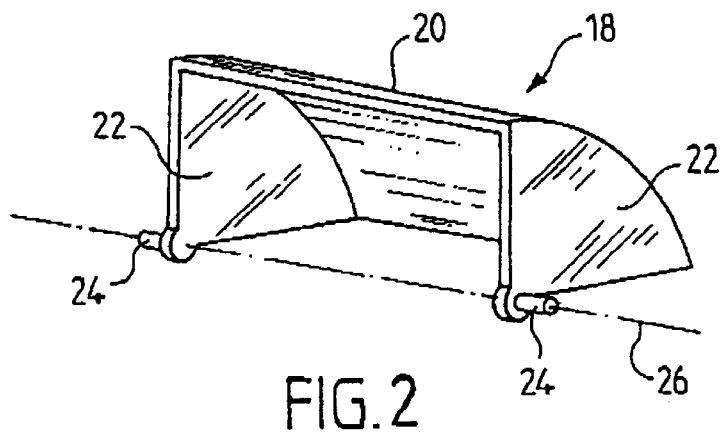
FIG. 2 is a perspective view of the air inlet flap of the device in FIG. 1.

The device 10 comprises an air intake chamber 12 provided with two air inlets 14 and 16. Inlet 14 can be fed with outside air AE taken from outside the passenger compartment H, while inlet 16 can be fed with a recirculated air flow AR taken from inside the passenger compartment. The inlets 14 and 16 are controlled by an air inlet flap 18 of the drum type, which is also represented in FIG. 2. This flap 18 has a cylindrical wall 20 connected to two angular sectors 22, each provided with two coaxial pivots 24 which together define the axis of rotation 26 of the flap. In the embodiment represented (FIG. 1), this axis 26 extends substantially horizontally.

The air intake chamber 12 is connected to a motor-driven fan unit 28, also referred to as a blower, which comprises a casing 30 of approximately cylindrical shape having a peripheral spiral 32 which, with an increasing cross-section, encloses a turbine 34. The spiral 32 is connected to a first flange 36, provided with a circular opening 38 through which the air intake chamber 12 communicates with the casing 30 of the motor-driven fan unit.

The spiral 32 is furthermore connected to a flange 40 located on the opposite side from the flange 36. The turbine 34 has the general form of a cylinder whose height H1 is markedly less than its diameter D1. This turbine has a multiplicity of blades 42, each bounded by an inner edge 43 of radius R2. The blades are connected to a central hub 44 which is force-fitted onto a shaft 46 of an electric motor 48. This motor has a cylindrical circular body bounded by an outer edge 49 of radius R3.

As can be seen in FIG. 1, the electric motor 48 is arranged on the same side as the air inlets 14 and 16, and therefore on the same side as the air intake, so as to protrude partly inside the air intake chamber 12. The motor 48 is arranged in such a way that its axis of rotation 50 extends substantially along the X-axis of the vehicle. Furthermore, this motor is located next to the partition T, and therefore towards the front of the vehicle relative to the turbine 34. The axis 50 of the motor is concentric with the opening 38.

The combination formed by the outside-air inlet 14 and the recirculated-air inlet 16 extends on either side of an arbitrary plane P passing through the axis of rotation 50 of the motor 48 of the motor-driven fan unit 28, which contributes to reducing the space taken up by the device by virtue of the respective positions of the inlets 14 and 16 and of the motor 48.

The air intake chamber 12 is thus supplied, depending on the position of the flap 18, with a flow of outside air AE, with a flow of recirculated air AR or with a mixture of the two. This air flow is taken in axially by the turbine and is then diverted into the tangential direction by the blades 42 of the turbine. The air delivered in this way leaves the casing 30 and enters a casing 52 (partially represented) of a heating and/or air-conditioning unit. This heating unit, which does not directly form part of the invention, has at least one heat exchanger, in the example an evaporator 54 and a heating radiator 56. The air flow can thus be heated and/or conditioned, and then delivered to the passenger compartment through various distribution pipes and outlets (not shown).

By virtue of the specific layout of the motor 48, a reduction in the axial space taken up by the air intake chamber and the motor-driven fan unit is obtained, which renders them more compact. It will also be noted that the two pivots 26 of the flap are located on either side of the motor 48, so that the pivoting axis 26 of the flap passes virtually through the motor, which makes it possible to reduce the axial space taken up. Instead of a flap of the drum type, it is also conceivable to use a flap of the shell type, also having two pivots located on either side of the motor. Because the motor is oriented towards the partition and towards the front of the vehicle, this leads to a reduction in noise.

As can be seen, an air flow enters the casing 28 of the motor-driven fan unit through an annular passage 58 bounded by the opening 38, of diameter D2, and by the body of the motor 48 of radius R3.

The following nomenclature will be used below:

S2 is the area of the surface of the disc bounded by the inner edge 43, of radius R2, of the blades 42 of the turbine;

S3 is the area of the surface of the disc bounded by the outer edge 49, of radius R3, of the body of the motor 48 of the turbine; and A is the area of the annular surface bounded externally by the inner edge 43 of the blades 42 of the turbine, and internally by the outer edge 49 of the body of the motor 48 of the turbine. In other words, A=S2–S3.

It is advantageous for the ratio A/S2, which can also be expressed as (S2–S3)/S2, to be between 0.5 and 0.8, and to be preferably equal to 0.7.

In order to have an air inlet cross-section equivalent to that obtained in the prior art, that is to say corresponding to just the circular opening, it may be necessary to increase the cross-section of the shroud as well as the diameter D1 of the turbine. This does not, however, constitute a drawback because it makes it possible to reduce the height H2 of the spiral (as defined between the flanges 36 and 40), which saves space in the X-axis direction. It also makes it possible to reduce the rotational speed of the motor, and to obtain an improvement acoustically.

Figure 3:
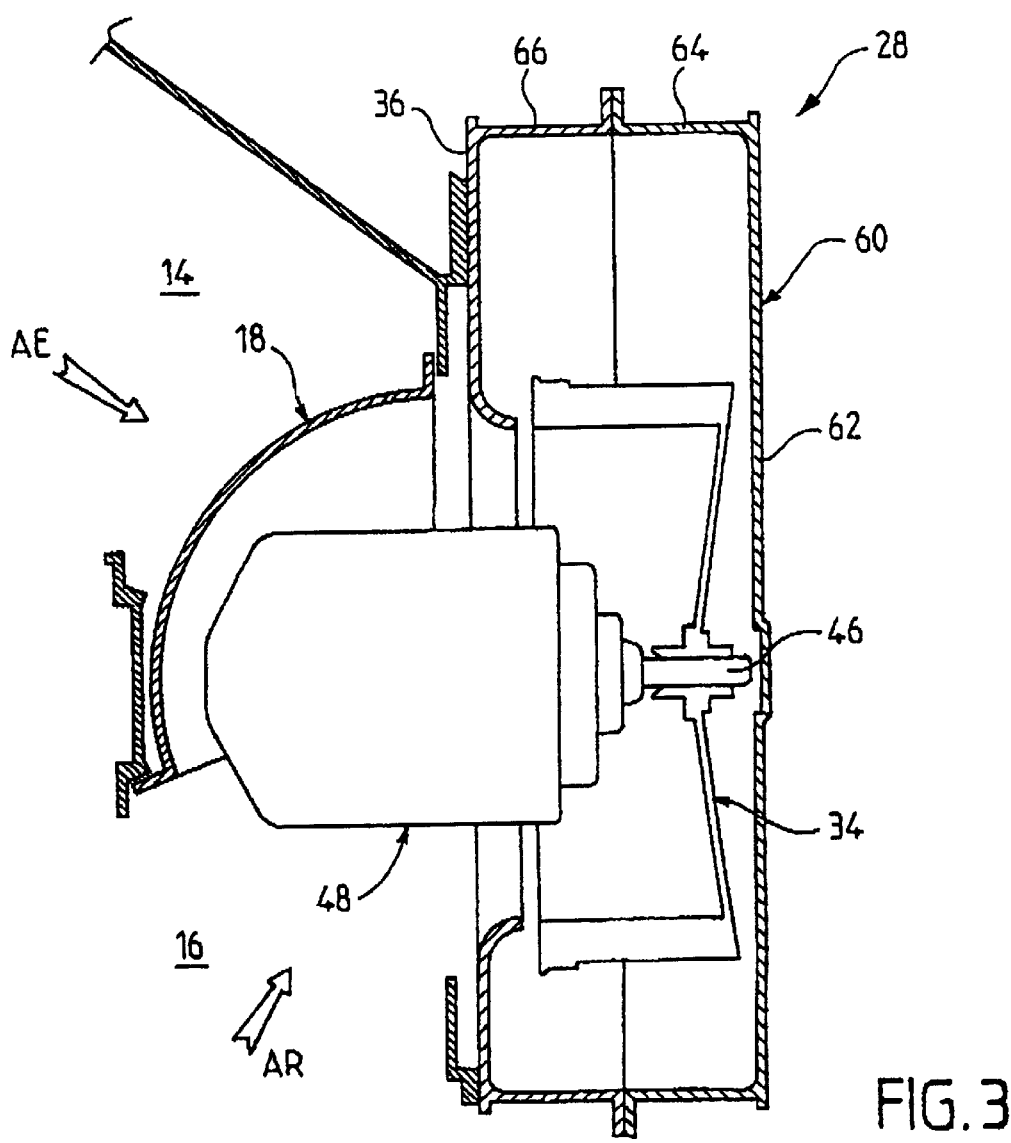
FIG. 3 is a view in partial section of the casing of the motor-driven fan unit, in another preferred embodiment.

In the embodiment in FIG. 3, the casing 28 of the motor-driven fan unit can be taken apart. For this purpose, it comprises a removable cover 60 which is located on the opposite side from the motor and replaces the flange 40 of the embodiment in FIG. 1. This removable cover 60 comprises a substantially flat base 62 connected to a peripheral rim 64 which can engage by fitting into a peripheral rim 66 of the casing, which is attached to the flange 36. The peripheral rims 64 and 66 thus together form the peripheral spiral of the casing.

It should be noted that the cover 60 is located on the same side as the passenger compartment, which makes it easier to take it off and thereby gain access to be motor-driven fan unit, for repair work.

Figure 4:
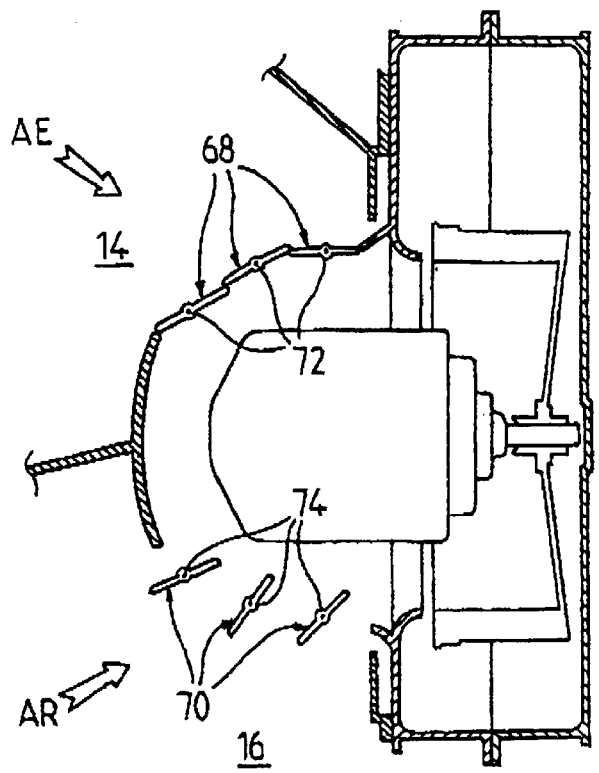
FIGS. 4 to 7 are sectional views similar to FIG. 3 for other embodiments of the shut-off flap or flaps.

The device in FIG. 4 is similar to the one in FIG. 3, apart from the fact that it comprises two sets of flaps 68 and 70, of the butterfly or slotted-shutter type, which can respectively control the outside-air inlet 14 and the recirculated-air inlet 16. The flaps 68 form registers mounted so as to pivot about parallel axes 72, and the flaps 70 likewise form registers mounted so as to pivot about parallel axes 74.

Figure 5:
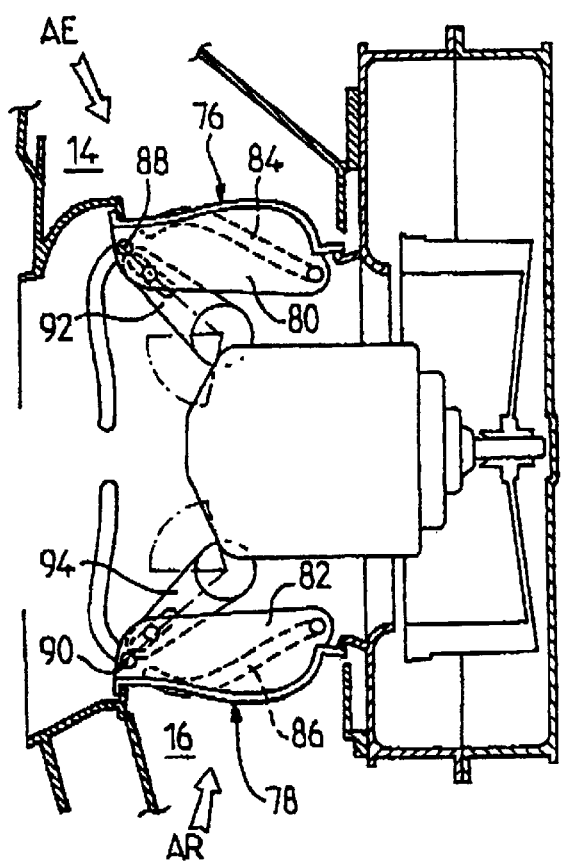

In the embodiment in FIG. 5, the device comprises two flaps 76 and 78, of the shell type, whose movements are coordinated and which can respectively control the outside-air inlet 14 and the recirculated-air inlet 16. The flaps 76 and 78 have respective flanges 80 and 82 which are provided with respective slots 84 and 86 and can engage with respective pivots 88 and 90. The result of this is that the flaps can each move with a combined rotational and translational movement while being located as close as possible to the motor, which contributes to reducing the space taken up. The flaps are moved in coordination by the action of two rotary levers 92 and 94.

Figure 6:
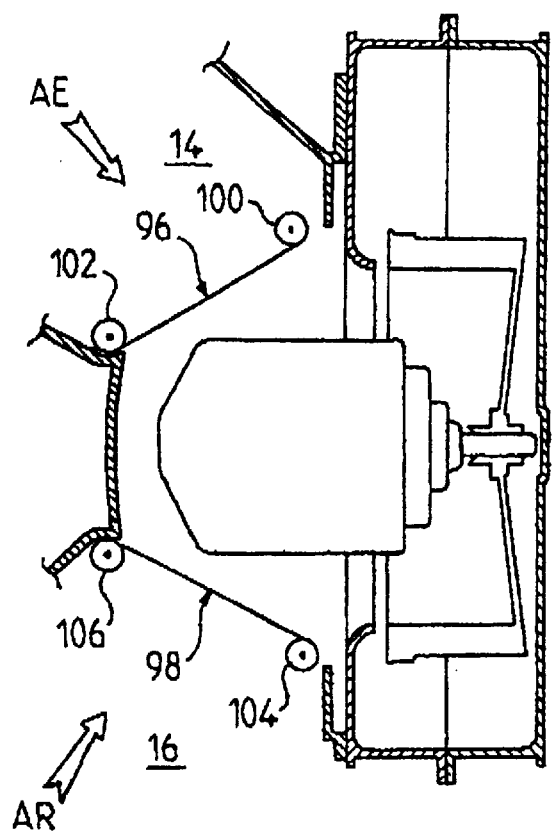
Figure 7:
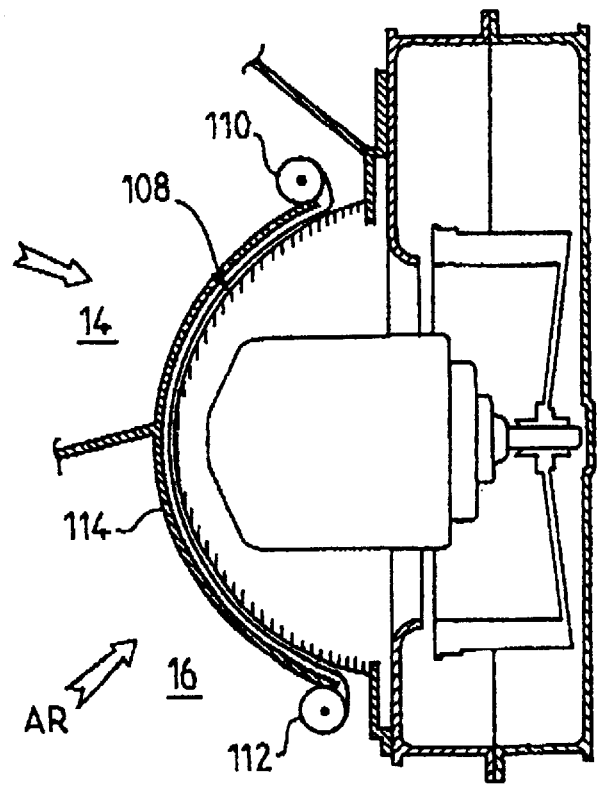

FIG. 6 shows another embodiment, in which the device comprises two flaps 96 and 98 of the film type, whose movements are coordinated and which can respectively control the outside-air inlet 14 and the recirculated-air inlet 16. Flap 96 is produced in the form of a film which is provided with an opening and is wound around two spools 100 and 102 with parallel axes. The same is true as regards flap 98, which is wound around two spools 104 and 106 with parallel axes. The device according to FIG. 7 comprises one flap 108, of the film type, which can control the outside-air inlet 14 and the recirculated-air inlet 16. The film has at least one opening and is wound around two spools 110 and 112 with parallel axes. This film is furthermore held in a guide 114 of curved shape.

The invention is not, of course, limited to be embodiments described above by way of example, and can be extended to other variants.

What is claimed is:

1. A motor-vehicle heating and/or air-conditioning device, comprising an air intake chamber having an inlet for outside air, an inlet for recirculated air and at least one flap which can selectively control said inlets, as well as a motor-driven fan unit which is arranged downstream of the air intake chamber, the fan unit comprising a casing accommodating a centrifugal turbine which is driven by a motor and being provided with blades and being able to take in an air flow axially, then deliver it tangentially to a heating and/or air-conditioning unit, wherein the combination formed by the outside-air inlet and the recirculated-air inlet extends on either side of an arbitrary plane passing through the axis of rotation of the motor of the motor-driven fan unit, said motor being located on the same side as the outside-air inlet and the recirculated-air inlet, and therefore on the same side as the intake of the air flow into the air intake chamber.

2. The device of claim 1, in which the casing of the motor-driven fan unit is provided with a circular opening which communicates with the air intake chamber, wherein the motor extends axially through said circular opening so that the air flow can enter the casing of the motor-driven fan unit through an annular passage.

3. The device of claim 2, which has a ratio A/S2 of between 0.5 and 0.8, and preferably equal to 0.7, where A represents the area of the annular surface bounded externally by the inner edge of the blades of the turbine and internally by the outer edge of the body of the motor of the turbine, while S2 represents the area of the surface of the disc bounded by the inner edge of the blades of the turbine.

4. The device of claim 1, wherein the axis of rotation of the motor is designed to extend substantially along the longitudinal axis, or X-axis, of the vehicle.

5. The device of claim 4, wherein the motor is designed to be placed towards the front of the vehicle, next to the partition separating the engine compartment from the passenger compartment.

6. The device of claim 1, which comprises a pivoting flap of the drum or shell type, which can control the outside-air inlet and the recirculated-air inlet and has two pivots spaced apart defining the axis of pivoting of the flap.

7. The device of claim 6, wherein the two pivots are located on either side of the motor, so that the axis of pivoting of the flap passes virtually through the motor.

8. The device of claim 1, which comprises two sets of flaps, of the butterfly or slotted-shutter type, which can respectively control the outside-air inlet and the recirculated-air inlet.

9. The device of claim 1, which comprises two flaps, of the shell type, whose movements are co-ordinated and which can respectively control the outside-air inlet and the recirculated-air inlet.

10. The device of claim 1, which comprises two flaps of the film type, whose movements are coordinated and which can respectively control the outside-air inlet and the recirculated-air inlet.

11. The device of claim 1, which comprises one flap, of the film type, which can control the outside-air inlet and the recirculated-air inlet.

12. The device of claim 1, wherein the casing of the motor-driven fan unit comprises a removable cover located on the opposite side from the motor.

13. The device of claim 12, in which the casing of the motor-driven fan unit comprises a peripheral spiral, wherein the cover comprises a substantially flat base connected to a peripheral rim which can be fitted to a peripheral rim of the casing, so that these peripheral rims together form the peripheral spiral.

* * * * *